(12) United States Patent
Sugita et al.

(10) Patent No.: US 6,168,721 B1
(45) Date of Patent: Jan. 2, 2001

(54) PROCESS FOR THE TREATMENT OF ARSENIC-CONTAINING SLUDGE

(75) Inventors: Satoru Sugita; Taku Shimizu; Koichiro Iwashita, all of Tokyo; Hiroshi Baba, Kobe; Hideki Kamiyoshi, Kobe; Morikata Nishida, Kobe, all of (JP)

(73) Assignee: Mitsubishi Heavy Industries, Ltd., Tokyo (JP)

( * ) Notice: Under 35 U.S.C. 154(b), the term of this patent shall be extended for 0 days.

(21) Appl. No.: 09/466,443

(22) Filed: Dec. 17, 1999

(30) Foreign Application Priority Data

Apr. 12, 1999 (JP) .................................................. 11-104017

(51) Int. Cl.$^7$ ........................................................ C02F 1/62
(52) U.S. Cl. .......................... 210/752; 210/724; 210/726; 210/768; 210/770; 210/774; 210/912
(58) Field of Search ..................... 210/724, 726, 210/749, 752, 768, 770, 774, 912

(56) References Cited

U.S. PATENT DOCUMENTS 5,378,366 * 1/1995 Yen ...................................... 210/758
5,651,895 * 7/1997 Gordon ............................... 210/912

FOREIGN PATENT DOCUMENTS

| 09192677 | 7/1997 | (JP) . |
| 10128396 | 5/1998 | (JP) . |
| 411047764 * | 2/1999 | (JP) . |

* cited by examiner

Primary Examiner—David A. Simmons
Assistant Examiner—Betsey Morrison Hoey
(74) Attorney, Agent, or Firm—Anderson, Kill & Olick, P.C.

(57) ABSTRACT

The present invention relates to a process for the treatment of arsenic-containing sludge obtained by adjusting arsenic-containing waste water to a PH of 12 or greater by the addition of a calcium compound and subjecting the waste water to solid-liquid separation, the process comprising the steps of adding a calcium compound to the arsenic-containing sludge slurry obtained by the solid-liquid separation, dewatering the resulting sludge, drying the dewatered sludge, and calcining the dried sludge. According to the present invention, arsenic-containing sludge obtained by treating waste water to precipitate arsenic present therein can be calcined to yield a calcined product which involves no risk of arsenic redissolution when it is dumped. Moreover, there is no possibility that arsenic compounds may be volatilized during calcination.

7 Claims, 4 Drawing Sheets

US 6,168,721 B1

PROCESS FOR THE TREATMENT OF ARSENIC-CONTAINING SLUDGE

FIELD OF THE INVENTION AND RELATED ART STATEMENT

This invention relates to a process for the treatment of arsenic-containing sludge wherein arsenic compound-containing sludge resulting from the flocculating settling treatment of arsenic-containing waste water is converted into a composition harmless to the environment.

As processes for the treatment of arsenic present in waste water, those based on adsorption, ion-exchange, sulfide precipitation, hydroxide coprecipitation and the like are known. Among these treatment processes, the hydroxide coprecipitation process involving treatment with a calcium compound, magnesium compound, iron compound or the like is the most representative one. An outline of this process is described below with reference to FIG. 2.

Arsenic-containing waste water 24 discharged from various plants and the like is introduced into a reaction tank 21. In the waste water, arsenic is present in the form of arsenite ion ($AsO_3^{3-}$) containing $As^{3+}$ and arsenate ion ($AsO_4^{3-}$) containing $As^{5+}$. If the content of $As^{3+}$ is high, it may be possible to previously add an oxidizing agent such as a peroxide (e.g., hydrogen peroxide) or a hypochlorite to the waste water and thereby oxidize $As^{3+}$ to hardly soluble $As^{5+}$. When a calcium compound or an iron compound 25 is added to the waste water, the reactions represented by the following reaction formulae (1) and (2) or (3) and (4) take place, so that the calcium or iron salts of arsenous acid and arsenic acid are formed and precipitated. In the process illustrated in FIG. 2, slaked lime is added as a typical one of such additives.

  (1)

  (2)

  (3)

  (4)

In addition to these reactions, the calcium compound and iron compound also act as flocculating agents. As a result, the arsenic compound-containing precipitate formed according to the above formulae (1) to (4) is gradually coarsened and becomes easier to settle.

Then, this reaction fluid is introduced into a settling tank 22 where solid matter is separated therefrom. The supernatant water is discharged out of the system as treated water 26, while the settled sludge 27 containing arsenic compounds and the like is withdrawn from the bottom of the tank, dewatered in a dewaterer 23, and discharged as a dewatered cake 29. Part of settled sludge 27 is returned to reaction tank 21 as returned sludge 28.

Moreover, in Japanese Patent Laid-Open No. 192677/'97, the present applicant has previously proposed a process for the treatment of waste water and sludge by two-stage flocculating settling which includes the steps of adding a calcium compound to waste water so as to convert arsenous acid and arsenic acid into their calcium salts and separate them by settling [see the above formulae (1) and (2)]; dewatering, drying and calcining the resulting sludge; and adding a ferric compound to the treated fluid so as to combine arsenous acid and arsenic acid with ferric ion and separate the resulting compounds by settling [see the above formulae (3) and (4)].

Furthermore, in Japanese Patent Laid-Open No. 128396/'98, the present applicant has also proposed a process for the treatment of sludge wherein, after sludge comprising the calcium salts of arsenous acid and arsenic acid is formed according to the treatment process of the aforementioned Japanese Patent Laid-Open No. 192677/'97 or the like, a solid calcium compound is added thereto in excess and then calcined to obtain a fired product which is so stable as to suffer from no arsenic redissolution.

However, the above-described conventional treatment processes have the following problems.

(1) The hydroxide coprecipitation process, when used alone, has low arsenic-removing efficiency and fails to meet the emission standards for harmful substances as prescribed by the Prime Minister's Office. Moreover, since this process is merely an example of a waste water treatment process and has not been as an integrated process, a suitable method for the treatment of sludge must be newly chosen according to the properties and components of the sludge produced. That is, if sludge containing arsenic compounds is simply dewatered, dried and dumped, a new source of environmental pollution will be produced. Accordingly, it is necessary to establish an integrated treatment process combining waste water treatment with sludge treatment.

(2) In the treatment process described in the aforementioned Japanese Patent Laid-Open No. 192677/'97, these problems are apparently solved. However, it can be imagined that a very small portion of the arsenic compounds pyrolyzed during the calcination of sludge may be volatilized into the atmosphere. In this respect, a problem still remains from the viewpoint of environmental health.

(3) The treatment process described in the aforementioned Japanese Patent Laid-Open No. 128396/'98 is effective in preventing the above-described volatilization of arsenic compounds into the atmosphere during calcination. However, since a solid calcium compound is added to dry sludge in this process, its operability is so low that the calcium compound may not be uniformly mixed with the sludge but gathered into lumps. In such a case, there is a possibility that only a slight amount of arsenic compounds may be volatilized during calcination.

OBJECT AND SUMMARY OF THE INVENTION

In order to solve the above-described problems of the prior art, an object of the present invention is to provide a process for the treatment of arsenic-containing sludge wherein arsenic-containing sludge obtained by treating waste water to precipitate arsenic present therein can be calcined to yield a calcined product which involves no risk of arsenic redissolution when it is dumped, and wherein there is no possibility that arsenic compounds may be volatilized during calcination.

The present invention has been made with a view to accomplishing the above object and has the following four constituents (1) to (9).

(1) A process for the treatment of arsenic-containing sludge obtained by adjusting arsenic-containing waste water to a pH of 12 or greater by the addition of a calcium compound and subjecting the waste water to solid-liquid separation, the process comprising the steps of adding a calcium compound to the arsenic-containing sludge slurry obtained by the solid-liquid separation, dewatering the resulting sludge, drying the dewatered sludge, and calcining the dried sludge.

(2) A process for the treatment of arsenic-containing sludge as described above in (1) wherein, when the number of moles of the calcium compound added in order to adjust the waste water to a pH of 12 or greater is represented by A, the number of moles of the calcium compound added to the arsenic-containing sludge slurry obtained by the solid-liquid separation is represented by B, and the total number of moles of the calcium compound required to neutralize the acidic waste water and the calcium compound reacting with the arsenic present in the waste water is represented by C, the degree of Ca excess as defined by (A+B)/C is in the range of 1.5 to 3.0.

(3) A process for the treatment of arsenic-containing sludge as described above in (1) or (2) wherein the calcium compound added to the arsenic-containing sludge slurry obtained by the solid-liquid separation is in the form of a slurry or a solution.

(4) A process for the treatment of arsenic-containing sludge as described above in any one of (1) to (3) wherein the dried sludge is calcined at a temperature of 650 to 900° C.

DETAILED DESCRIPTION OF PREFERRED EMBODIMENTS

Figure 1:
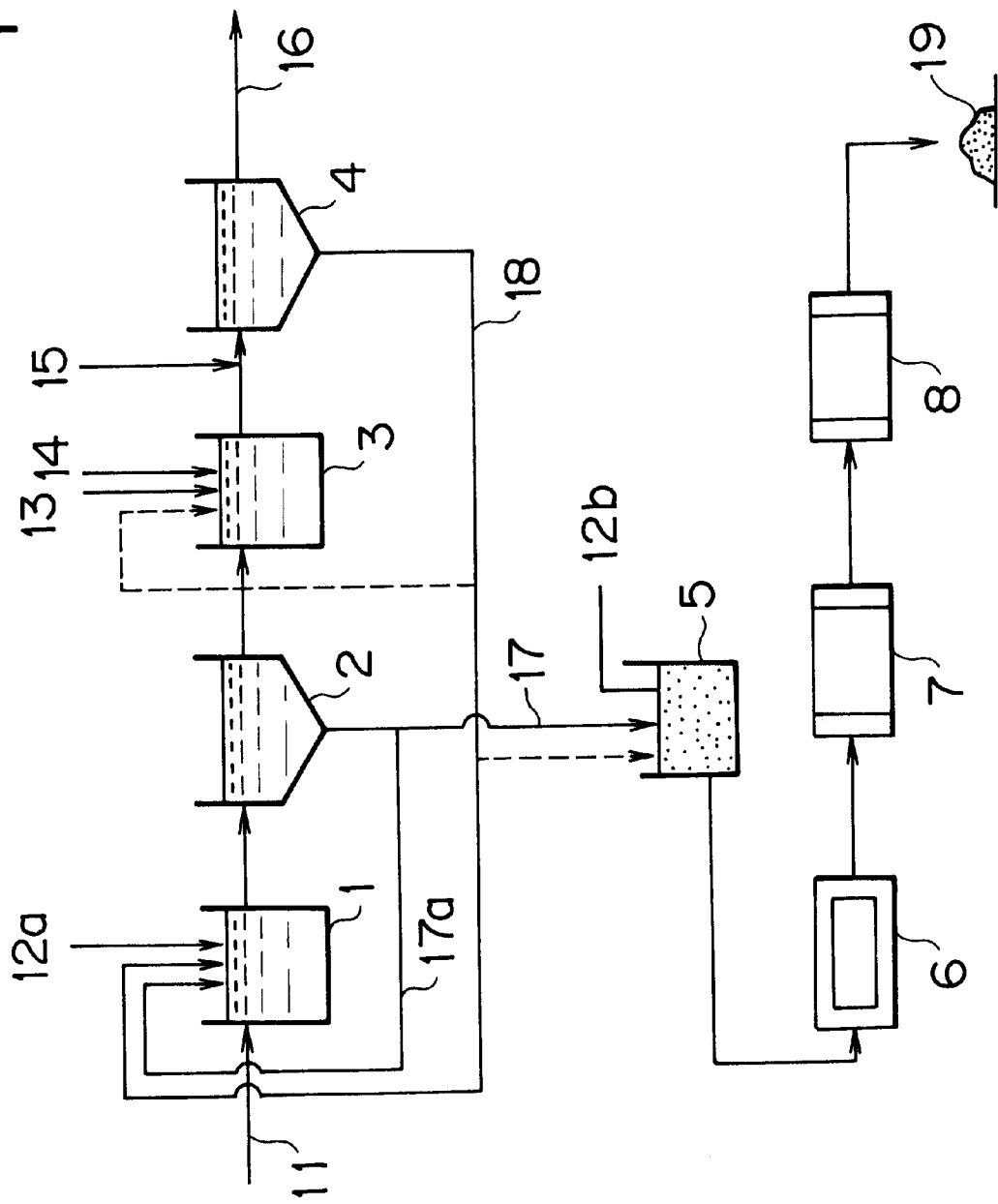
FIG. 1 is a flow diagram illustrating one embodiment of the process for the treatment of arsenic-containing sludge in accordance with the present invention.
Figure 2:
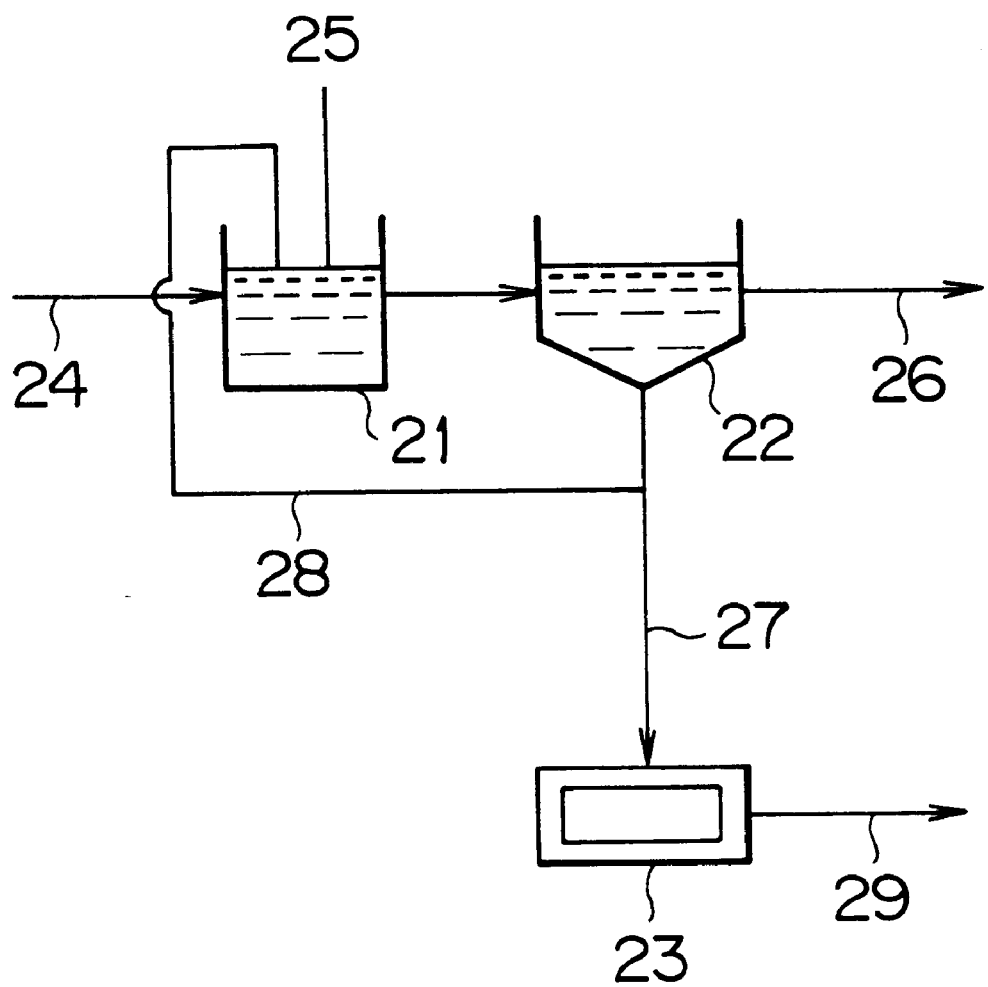
FIG. 2 is a flow diagram illustrating an example of a conventional process for the treatment of arsenic-containing sludge.

The present invention is more specifically described hereinbelow. First of all, an oxidizing agent (e.g., a peroxide or a hypochlorite) is added to arsenic-containing waste water, if necessary, so as to oxidize $As^{3+}$ to $As^{5+}$. Thereafter, the waste water is adjusted to a pH of 12 or greater by the addition of a calcium compound. Thus, arsenic ion and other heavy metals are converted into hydroxides, resulting in the formation of flocs. Usable calcium compounds include calcium hydroxide (slaked lime), calcium oxide (quick lime), calcium carbonate, calcium chloride, and mixtures of two or more such compounds. They are preferably used in the form of an aqueous slurry or an aqueous solution.

Then, these flocs are separated from the reaction fluid by settling or the like, and part of the resulting arsenic-containing sludge slurry is returned and introduced into untreated waste water. The remainder is mixed with an additional calcium compound, dewatered, dried and calcined.

Although it may seem possible to add an additional calcium compound in the aforesaid step of adjusting the waste water to a pH of 12 or greater, this is undesirable because, in the pH range of 12 and greater, the required amount of calcium compound cannot be accurately added by resorting to pH adjustment alone and, moreover, the performance of the auxiliary polymeric flocculant is reduced to cause a decrease in solid-liquid separation capability. Although the additional calcium compound added to the arsenic-containing sludge slurry may be used in the form of crystals or powder, it is preferable to use the same slurry or aqueous solution as used in the aforesaid step of adjusting the waste water to a pH of 12 or greater, because this can simplify the types of the chemicals used and their feeding means and because this causes the arsenic-containing sludge to be thoroughly mixed with the calcium compound and is hence effective in preventing the volatilization of arsenic compounds during calcination. Moreover, by using the calcium compound in liquid form, the control of the amount of calcium compound injected can be automated by ON-OFF operations with the aid of a timer.

When the calcined product obtained by the above-described treatment is buried in the ground, essentially no arsenic dissolves into underground water or rainwater and, therefore, the effect exerted on the environment is minimized.

In the process of the present invention, it is preferable that, when the number of moles of the calcium compound added in the step of adjusting the waste water to a pH of 12 or greater is represented by A, the number of moles of the calcium compound added to the arsenic-containing sludge slurry obtained by solid-liquid separation is represented by B, and the total number of moles of the calcium compound required to neutralize the acidic waste water and the calcium compound reacting with the arsenic present in the waste water is represented by C, the degree of Ca excess as defined by (A+B)/C be in the range of 1.5 to 3.0.

More specifically, the amount of calcium compound required to adjust the waste water to a pH of 12 may vary according to the rate of addition to the waste water, and the like. However, when the calcium compound comprises slaked lime, the degree of Ca excess (A/C) should be in the range of about 1.1 to 1.2 under such conditions that sulfuric acid ($SO_4^{-2}$) present in the waste water reacts with slaked lime to form platy gypsum having a large crystalline size and can hence be filtered off easily. Accordingly, the amount of calcium compound added in the step of adjusting the waste water to a pH of 12 or greater is usually determined so as to give a degree of Ca excess (A/C) of about 1.1 to 1.5.

On the other hand, the amount of calcium compound added to the arsenic-containing sludge slurry obtained by solid-liquid separation is determined so as to give a degree of Ca excess [(A+B)/C] of 1.5 to 3.0. If the degree of Ca excess is less than 1.5, no sufficient effect will be produced, while if it is greater than 3.0, the process will be disadvantageous from the viewpoint of cost. Even if the amount of calcium compound added in the step of adjusting the waste water to a pH of 12 or greater gives a degree of Ca excess (A/C) of greater than 1.5, the addition of a calcium compound (e.g., slaked lime) to the arsenic-containing sludge slurry obtained by solid-liquid separation is effective in reducing the amount of arsenic dissolving out from the fired product obtained by calcination.

The fluid having undergone the aforesaid solid-liquid separation is adjusted to a pH of 6 to 9 by the addition of a ferric salt and an acid. Thus, the arsenic remaining in the fluid is contained in and coprecipitated with the simultaneously formed ferric hydroxide flocs. Moreover, if desired, a polymeric flocculant may be added to coarsen the flocs and further facilitate the solid-liquid separation. After the flocs are separated from the reaction fluid, for example, by settling, the resulting sludge slurry is returned and introduced into untreated waste water, or returned to the reaction fluid in the step of adding a calcium compound to waste water. Thus, the waste water is almost completely freed of arsenic and can hence be discharged as treated water capable of meeting the emission standard.

Now, the process of the present invention is explained below with reference to FIG. 1 which is a schematic diagram illustrating one embodiment thereof. In FIG. 1, reference numeral 1 designates a first reaction tank in which waste water introduced thereinto is adjusted to a pH of 12 or greater by the addition of a calcium compound (e.g., slaked lime) in the form of a slurry; 2, a first flocculating settling tank in which the flocs formed in first reaction tank 1 is separated by settling; 3, a second reaction tank in which the water separated in and discharged from first flocculating settling tank 2 is adjusted to a pH of 6 to 9 by the addition of a ferric compound; 4, a second flocculating settling tank in which the flocs formed in second reaction tank 2 is separated by settling; and 5, a sludge storage tank in which the arsenic compound-containing sludge slurry, largely separated by settling in first flocculating settling tank 2, is received and stored after the addition of the same calcium compound slurry as added to the aforesaid first reaction tank 1. Moreover, reference numeral 6 designates a dewaterer for dewatering the sludge fed from sludge storage tank 5; 7, a drier for drying the cake formed in dewaterer 6; and 8, a calcining furnace for calcining the dry solid matter formed in drier 7.

In the process having the above-described construction, arsenic-containing waste water 11 discharged from various plants and the like is introduced into first reaction tank 1. When a large amount of arsenic is contained in waster water 11 as $As^{3+}$, an oxidizing agent such as a peroxide or a hypochlorite may previously be added thereto. The oxidation of arsenic to $As^{5+}$ is more preferable for the purpose of preventing the redissolution of arsenic from the fired product obtained by calcination. Moreover, this is considered to be effective in reducing the calcination temperature, but the details thereof are not known yet. When this waste water 11 is adjusted to a pH of 12 or greater by the addition of a calcium compound (e.g., a slurry of slaked lime 12a), flocs of calcium arsenate, calcium arsenite, and hydroxides of heavy metals such as iron and copper are formed. Then, this reaction fluid is introduced into first flocculating settling tank 2 where it is subjected to solid-liquid separation. If a polymeric flocculent (not shown) is further added to the reaction fluid in first flocculating settling tank 2 or at a position on its inlet pipeline, the flocs will be coarsened to further facilitate their separation by settling. The method of solid-liquid separation is not limited to separation by settling as employed in this embodiment, but may be, for example, filtration. After the reaction fluid is allowed to stay in first flocculating settling tank 2 for a predetermined period of time, the resulting sludge is withdrawn from the bottom of the tank as first flocculated settled sludge 17 (i.e., an arsenic-containing sludge slurry). Part of this arsenic-containing sludge slurry is returned to first reaction tank 1 as returned sludge 17a and mixed with untreated waste water to promote the formation of flocs, while the remainder is introduced into sludge storage tank 5.

To the arsenic-containing sludge slurry within sludge storage tank 5, a calcium compound comprising a slurry of slaked lime 12b, which may be the same as that added to the aforesaid first reaction tank 1, is added with thorough mixing. Thereafter, the resulting sludge is fed to a dewaterer (e.g., a filter press or centrifugal separator) 6 for dewatering it, the dewatered sludge is fed to a drier 7 for drying it at a temperature of around 200° C., and the dried sludge is fed to a calcining furnace 8 for calcining it. If the calcination temperature is 600° C. or above, essentially no arsenic will dissolve out from the fired product obtained by the calcination. However, with consideration for safety and economy, it is preferable that the calcination temperature be in the range of 650 to 900° C. and, in particular, 650 to 800° C.

As described in the aforementioned Japanese Patent Laid-Open No. 128396/'88, when the degree of Ca excess is in the range of 1.5 to 3.0 and the sludge is calcined at a temperature of 650 to 900° C., the amount of arsenic dissolving into rainwater or underground water from the fired product obtained by calcination and disposed of by landfill or dumping meets the arsenic dissolution standard of not greater than 0.3 mg per liter as prescribed under the Enforcement Ordinance of the Waste Disposal Law.

When this fired product 19 obtained by calcination is dumped, essentially no harmful substances (e.g., arsenic) dissolve into underground water or rainwater and, therefore, the effect exerted on the environment is minimized. Moreover, by adding a calcium compound to the arsenic-containing sludge in the form of a slurry and then dewatering, drying and calcining it, the volatilization of arsenic into the atmosphere during calcination can be suppressed almost completely.

The fluid having undergone solid-liquid separation in the aforesaid first flocculating settling tank 2 is introduced into second reaction tank 3, where an iron compound comprising, for example, ferric chloride 14 and an acid comprising, for example, hydrochloric acid 13 are added thereto so as to adjust it to a pH of 6 to 9. Thus, the arsenic remaining in the fluid is converted into iron arsenate, which is contained in and coprecipitated with the simultaneously formed ferric hydroxide flocs. Although usable iron compounds include ferric chloride, ferric sulfate and the like, ferric sulfate is not preferred because this forms calcium sulfate and hence causes an increase in the amount of sludge, and ferric chloride is the most suitable. As to acids, sulfuric acid is not preferred for a similar reason, and hydrochloric acid is the most suitable.

The resulting reaction fluid is introduced into second flocculating settling tank 4. If a polymeric flocculant 15 is further added to the reaction fluid in second flocculating settling tank 4 or at a position on its inlet pipeline, the flocs will be coarsened to further facilitate their separation by settling. Again, the method of solid-liquid separation is not limited to separation by settling as employed in this embodiment, but may be, for example, filtration. After the reaction fluid is allowed to stay in second flocculating settling tank 4 for a predetermined period of time, the resulting sludge is withdrawn from the bottom of the tank as second flocculated settled sludge 18. This second flocculated settled sludge 18 is returned to first reaction tank 1 or second reaction tank 3 so as to promote the formation of flocs. If desired, part thereof may be introduced into sludge storage tank 5 and treated together with first flocculated settled sludge 17 from first flocculating settling tank 2.

Thus, the supernatant water separated in second flocculating settling tank 4 is almost completely freed of arsenic and can hence be discharged as treated water 16 capable of meeting the emission standard.

Owing to the above-described construction, the process for the treatment of arsenic-containing sludge in accordance with the present invention brings about the following effects.

(1) As an integrated process extending from waste water treatment to sludge treatment, the process of the present invention can make waste water and sludge harmless to such an extent as to meet the emission standards therefor. Moreover, the process of the present invention is applicable to sludge having a wide variety of properties and compositions, so that it is unnecessary to newly choose a sludge treatment process according to the properties and components of the sludge produced.

(2) When the fired product is disposed of by landfill or dumping as an industrial waste, it does not redissolve into rainwater or underground water and thereby meets the arsenic dissolution standard of not greater than 0.3 mg per liter as prescribed under the Enforcement Ordinance of the Waste Disposal Law. Thus, the fired product involves no risk of producing a new source of environmental pollution.

(3) By mixing the arsenic-containing sludge slurry with the same calcium compound in liquid form as used in the step of adjusting waste water to a pH of 12 or greater, the types of the chemicals and their feeding means can be simplified. Moreover, the process of the present invention has such good operability that the arsenic-containing sludge and the calcium compound are thoroughly mixed with each other. Consequently, the volatilization into the atmosphere of gaseous arsenic produced by the pyrolysis of arsenic compounds during the calcination of the arsenic-containing sludge can be prevented almost completely, thus contributing to environmental protection.

EXAMPLE 1

Arsenic-containing sulfuric acid plant waste water discharged from a copper refinery was adjusted to a pH of 12 or greater by the addition of slaked lime (with a degree of Ca excess of 1.4), and the resulting sludge slurry having the composition shown in Table 1 was separated by settling. Then, a 10% slurry of slaked lime was further added thereto in such an amount as to give a degree of Ca excess of 1.5–3.0. This sludge slurry was thoroughly agitated and filtered to obtain a cake, which was dried and then calcined at 700–900° C. for 10 minutes.

In Comparative Example 1, the same sludge slurry as described above was filtered and dried. Then, a powder of slaked lime was added to the dried sludge in such an amount as to give a degree of Ca excess of 1.5–3.0. This mixture was thoroughly agitated and then calcined at 700–900° C. for 10 minutes.

TABLE 1

| Composition (wt. %, on a solid basis) | | | | | Water content |
|---|---|---|---|---|---|
| CaO | $SO_4$ | $Fe_2O_3$ | CuO | $As_2O_3$ | (wt. %) |
| 41.0 | 40.9 | 0.5 | 0.5 | 8.0 | 45.0 |

In Example 1 and Comparative Example 1, the relationship between the degree of Ca excess and the percentage of arsenic (As) volatilization during calcination was examined by calcining the sludge at various predetermined temperatures. The results thus obtained are shown in FIG. 3.

Figure 3:
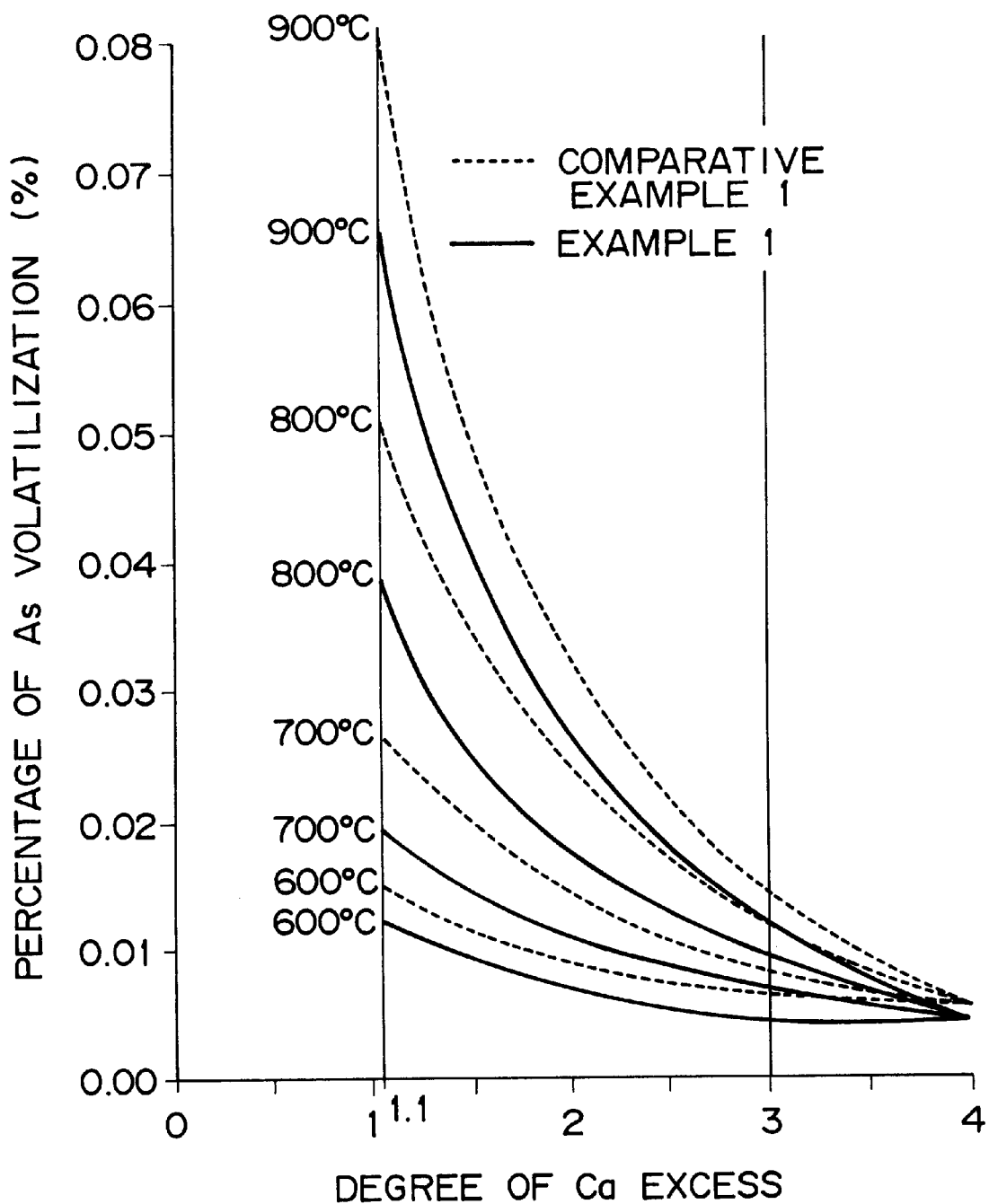
FIG. 3 is a graph showing the relationships between the degree of Ca excess and the percentage of As volatilization as observed in Example 1 and Comparative Example 1.

It can be seen from FIG. 3 that, when the degree of Ca excess is varied over the range of 1.5 to 3.0, the percentage of arsenic volatilization during calcination is lower in Example 1 than in Comparative Example 1. This indicates that, irrespective of the degree of Ca excess, the volatility of arsenic is reduced by adding a calcium compound to the sludge in the form of a slurry and mixing them thoroughly.

EXAMPLE 2

The same waste water as described in Example 1 was adjusted to a pH of 12 or greater by the addition of slaked lime (with a degree of Ca excess of 1.4), and the resulting sludge slurry having the same composition as shown in Table 1 was separated by settling. Then, a 10% slurry of slaked lime was further added thereto in such an amount as to give a degree of Ca excess of 1.5. This sludge slurry was thoroughly agitated and filtered to obtain a cake, which was dried and then calcined at 600–900° C. for 10 minutes.

In Comparative Example 2, the same sludge slurry as described above was filtered and dried. Then, a powder of slaked lime was added to the dried sludge in such an amount as to give a degree of Ca excess of 1.5. This mixture was thoroughly agitated and then calcined at 600–900° C. for 10 minutes.

In Example 2 and Comparative Example 2, the relationship between the calcination temperature and the percentage of arsenic (As) volatilization during calcination was examined. The results thus obtained are shown in FIG. 4.

Figure 4:
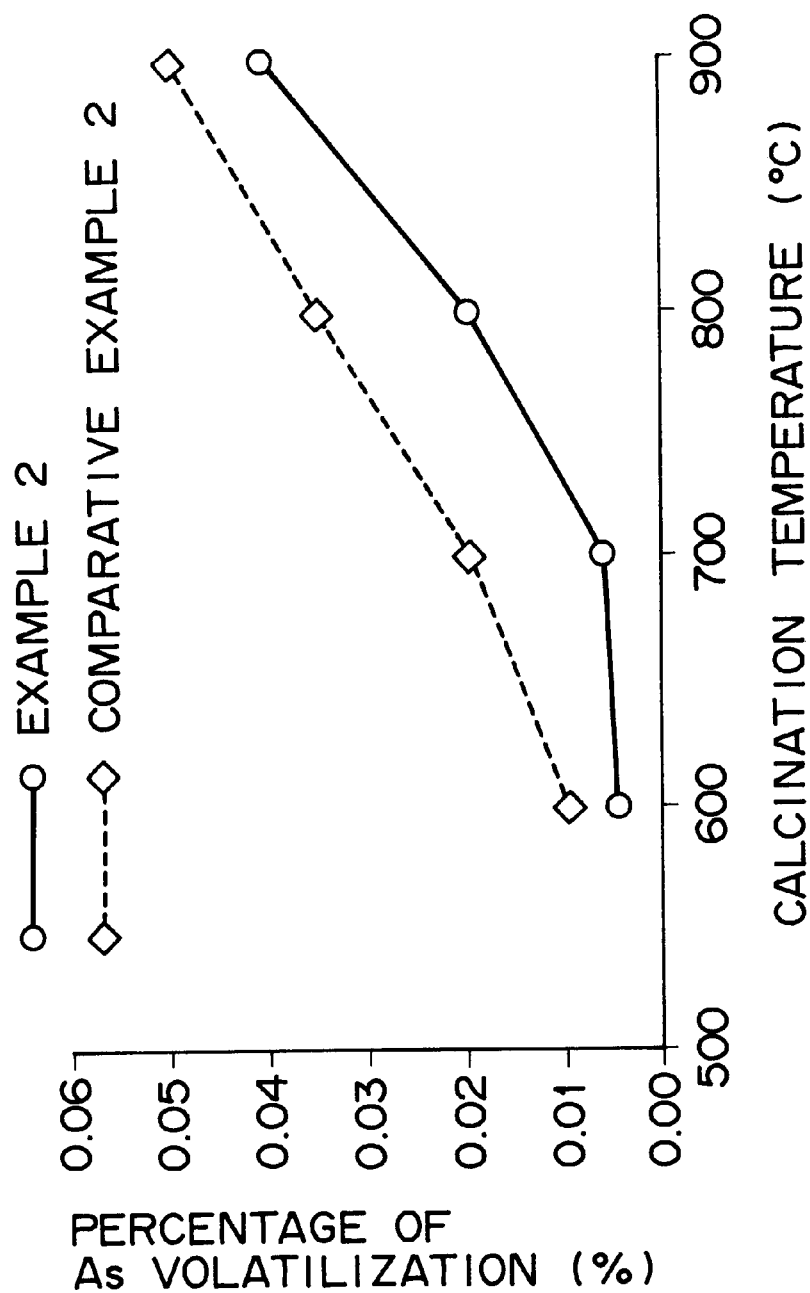
FIG. 4 is a graph showing the relationships between the calcination temperature and the percentage of As volatilization as observed in Example 2 and Comparative Example 2.

It can be seen from FIG. 4 that, when the degree of Ca excess is kept constant and the calcination temperature is varied over the range of 600 to 900° C., the percentage of arsenic volatilization during calcination is lower in Example 2 than in Comparative Example 2. This indicates that, irrespective of the calcination temperature, the volatility of arsenic is reduced again by adding a calcium compound to the sludge in the form of a slurry and mixing them thoroughly.

What is claimed is:

1. A process for the treatment of arsenic-containing sludge obtained by adjusting arsenic-containing waste water to a pH of 12 or greater by the addition of a calcium compound and subjecting the waste water to solid-liquid separation, the process comprising the steps of adding a calcium compound to the arsenic-containing sludge slurry obtained by the solid-liquid separation, dewatering the resulting sludge, drying the dewatered sludge, and calcining the dried sludge.

2. A process for the treatment of arsenic-containing sludge as in claim 1 wherein, when the number of moles of the calcium compound added in order to adjust the waste water to a pH of 12 or greater is represented by A, the number of moles of the calcium compound added to the arsenic-containing sludge slurry obtained by the solid-liquid separation is represented by B, and the total number of moles of the calcium compound required to neutralize the acidic waste water and the calcium compound reacting with the arsenic present in the waste water is represented by C, the degree of Ca excess as defined by (A+B)/C is in the range of 1.5 to 3.0.

3. A process for the treatment of arsenic-containing sludge as in claim 1 wherein the calcium compound added to the arsenic-containing sludge slurry obtained by the solid-liquid separation is in the form of a slurry or a solution.

4. A process for the treatment of arsenic-containing sludge as in claim 1 wherein the dried sludge is calcined at a temperature of 650 to 900° C.

5. A process of the treatment of arsenic-containing sludge as in claim 2 wherein the calcium compound added to the arsenic-containing sludge slurry obtained by the solid-liquid separation is in the form of a slurry or a solution.

6. A process for the treatment of arsenic-containing sludge as in claim 2 wherein the dried sludge is calcined at a temperature of 650 to 900° C.

7. A process for the treatment of arsenic-containing sludge as in claim 3 wherein the dried sludge is calcined at a temperature of 650 to 900° C.

* * * * *